Jan. 19, 1954
B. DASCH
2,666,469
LAMELLAS FOR TRACTOR WHEELS
Filed Dec. 26, 1950
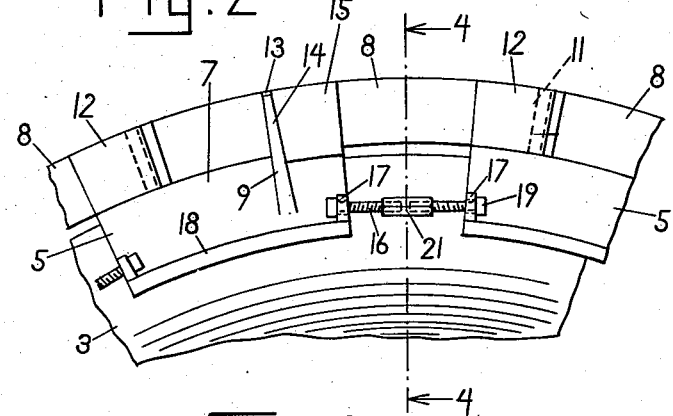
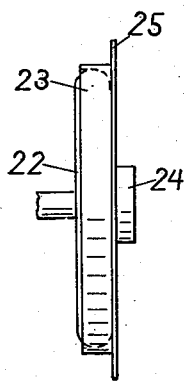
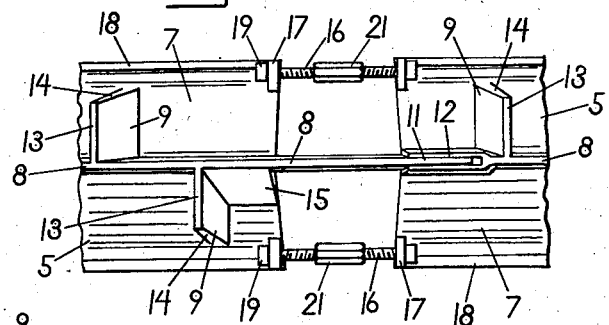
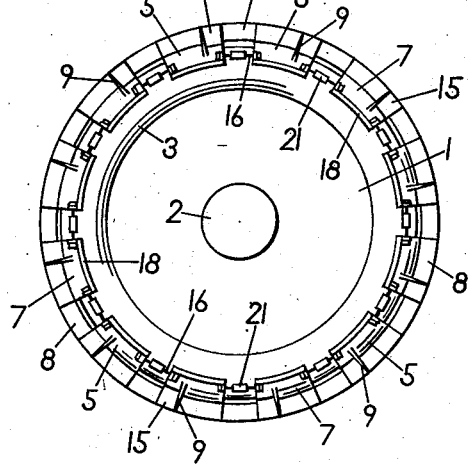
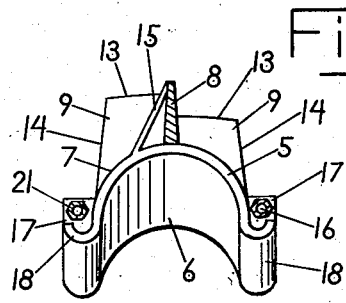
Inventor:
BENNO DASCH
By Otto Steinitz
AGENT Patented Jan. 19, 1954

2,666,469

UNITED STATES PATENT OFFICE 2,666,469

LAMELLAS FOR TRACTOR WHEELS

Benno Dasch, Quito, Ecuador, assignor of one-half to Transamerican Mercantile Corporation, New York, N. Y., a corporation of New York Application December 26, 1950, Serial No. 202,701

2 Claims. (Cl. 152—183)

My invention relates to attachments for the wheels of tractors or of other motor cars, such as trucks, tanks or jeeps, which shall be driven on soft or muddy ground. An object of my invention is to adapt a motor vehicle to this purpose whereby, for example, a tractor can be safely and efficiently operated on loose acre soil.

Other objects are to increase the frictional engagement between wheel and soil, to provide wheels with gripping blades of large surfaces preventing sliding movement of the wheels in the driving direction, to provide wheels with circular blades forming grooves in the soil in the driving direction whereby the wheels are secured against sliding in lateral direction, thereby to secure a rolling movement of the wheels without the losses of speed and of energy resulting from sliding movement, to avoid excavations of the soil and digging of wheels into the soil by such sliding movements, and to secure a safe propulsion and steerage of the vehicle under all circumstances, for example, in curves or when the ground slopes laterally or rises in the driving direction.

Further objects are to make possible the temporary movement of the vehicle on harder roads or on pavement, to provide the wheels with a periphery forming an uninterrupted circle, thereby to secure a smooth rolling movement on such roads or pavements and to avoid damaging the road surface and jumping or vibrating movements of the vehicle.

Still other objects are to protect the wheels and their tires from damage by hard ingredients or projections of the soil, to space these tires from the ground, and to provide wheels with lamellas having large surfaces fitting the outer curvature of the tires whereby these lamellas form protective shields and do not impress or damage the tires.

Still another object is to increase the engagement between the wheels and the soil in such a manner that sufficient propulsion is secured without the necessity of adding additional weight or of filling the tires with water, whereby the vehicle can be operated on soft soil with less weight and with less power consumption.

Still further objects are to facilitate the separation of the rolling blades from the soil engaged, thereby to avoid clinging of the soil to the wheels, and to keep the wheels permanently in clean and well operating condition.

Still other objects are to connect the individual lamellas in a circularly closed series, to position the series of lamellas about the periphery of a wheel or about the peripheries of two wheels whereby, in the latter case, the vehicle is transformed into a caterpillar, to make the connecting means easily disconnectable and easily adjustable to the required length of the lamella circle, and to facilitate the attachment of the lamellas to the tires.

Still further objects are to attain these results with simple means, with means that can be easily kept in good working condition, and to provide an attachment of the mentioned nature that can be inexpensively made, and can be conveniently mounted and handled.

Still other objects and advantages will appear from the following description of an exemplifying embodiment of my invention, from the appended claims and from the accompanying drawing in which:

Fig. 1 shows a side view of a tractor wheel and of an illustrative embodiment of my invention attached thereto.

Fig. 2 shows a broken off part of Fig. 1 represented on a larger scale.

Fig. 3 shows a top view of a broken off part of the embodiment shown in Fig. 1.

Fig. 4 shows a cross-section of the same embodiment, taken along the line 4—4 in Fig. 2.

Fig. 5 shows a front view of a front wheel of a tractor adapted for use in a tractor having rear wheels provided with attachments according to Figs. 1 to 4.

Referring to the drawing, numeral 1 indicates a driving or rear wheel of a tractor. The wheel 1 is provided with a hub cap 2 and with a tire 3.

According to my invention, a plurality of lamellas or shields 5, for example, twelve are distributed about the periphery of the tire 3. Each lamella has a broad concave side 6 fitting the curvature of the peripheral surface of the tire 3. The opposite, outer side 7 of the lamella is correspondingly convex. Blades 8 and 9 extend from the surface 7 in outward directions substantially perpendicular to this surface.

One blade 8 forms an outer extension of each lamella 5. Each blade 8, viewed in a direction parallel to the wheel axis, forms a ring sector or segment which extends along and beyond the lamella to which it is connected, bridging over the space between neighboring lamellas and reaching at least as far as the neighboring blade 8 whereby all blades 8 together form a complete circle which is concentric with the wheel. Preferably, each two neighboring blades 8 overlap in such a manner that a peripherally projecting end 11 of one ring segment reaches into a forked end 12 of the neighboring ring segment.

Each lamella 5 may be provided with one or more blades 9 which extend across the lamella laterally from the blade 8 of this lamella and radially with respect to the wheel axis. For example, each lamella may have two blades 9 positioned at opposite sides of the blade 8. Preferably, these two blades 9 have positions shifted in peripheral direction of the wheel relatively to each other whereby, in this direction, blades 9 positioned at the right side alternate with blades 9 positioned at the left side. The outer small sides 13 of these blades are preferably convex and curved in such a manner that they slightly slope from a level flush with the blade 8. The small lateral sides 14 of the blades are preferably slightly oblique in such a manner that each blade 9 is broader at the line connected to the lamella than at the outer side 13.

The blades 8 and 9 are relatively thin, and their thickness tapers preferably toward the outer sides.

Each or some of the lamellas may be further provided with one or more stiffening plates 15 which connect the ring segment 8 with the lamella surface and are positioned obliquely over the angle formed by these connected elements. Preferably, each plate 15 connects also with one of the blades 9, abutting this blade along a connecting line extending from the ring segment to the lamella.

The lamellas 5 are connected in a series forming a closed circle. Preferably the individual lamellas are spaced from each other and are connected by means allowing slight relative movements of the lamellas whereby the lamellas together with the tire supporting the lamellas have a certain resiliency. The length of the connecting means is adjustable in order to facilitate the attachment of the lamellas to the tire and in order to adapt the ring of lamellas to the diameter of the tire. Various types of means which are suitable for this connection are well known. Preferably, these means are constructed as follows:

Those sides of the lamellas which face sides of neighboring lamellas are provided with openings through which bolts 16 pass with some clearance. These openings may be provided in plates 17 affixed to the lamellas at the ends of their marginal rims 18. The rims 18 are preferably bent to form channels extending in peripheral directions whereby the lamellas and the plates 17 are stiffened and the lamellas have no sharp edges contacting the tire.

Each bolt 16 has a head 19 from which the bolt projects through the opening of a plate 17. The projecting part of the bolt is provided with a screw thread which is engaged by one end of an elongated nut 21. The other end of this nut engages a similar bolt which passes through a similar opening of the neighboring lamella. The two bolts engaged by one nut 21 have oppositely wound threads, and the engaging ends of the nut 21 are threaded correspondingly in oppositely winding directions.

The lamellas may be attached to the driving wheels only, and the not driving front wheels of a tractor may be left uncovered. Or these front wheels may be covered with a protection which has no cross blades like the blades 9. For example, a front wheel 22 (Fig. 5) may be covered by a cylindrical body 23 which is placed on the wheel from the side of the axle cap 24 and has a ring-shaped projection 25 similar to the ring formed by the segments 8.

All parts of the described embodiment are preferably made of steel. Each lamella 5, the blades 8 and 9 affixed to the same, the rims 18 and the plates 15 and 17 of this lamella may be made in one piece which may be stamped and pressed, forged or cast. Or all or some of these parts may be united by welding or any other suitable method.

The lamellas may be kept permanently in connected position when they are not attached to the wheel, except that the bolts connecting one pair of neighboring lamellas must be separated before the lamellas are attached to the wheel. The wheel may be driven over one of the latter lamellas from the disengaged side and farther over the following connected lamellas whereby the ring of lamellas will place itself about the wheel. Then, the disengaged bolts are connected and all nuts are tightened as far as necessary to secure frictional engagement between the lamellas and the tire.

I desire it understood that my invention is not confined to the particular embodiment shown and described, the same being merely illustrative, and that my invention may be carried out in other ways within the scope of the appended claims without departing from the spirit of my invention as it is obvious that the particular embodiment shown and described is only one of the many that may be employed to attain the objects of my invention.

Having described the nature of my invention, what I claim and desire to protect by Letters Patent is:

1. An attachment for a wheel tire, comprising a plurality of lamellas, means for connecting said lamellas in wide spaced positions distributed about the periphery of said tire, each of said lamellas having a concave surface fitting the peripheral surface of said tire and having outwardly bent marginal rims positioned laterally with respect to said tire, said connecting means engaging said lamellas near said marginal rims, and a plurality of blades shaped like ring sectors, each of said blades being affixed to and extending in radial direction outwardly from one of said lamellas being positioned farther radially outward than said connecting means and extending in peripheral direction beyond said lamella, each of said ring sectors having a forked end and having another end slidably positioned in the forked end of a neighboring ring sector whereby said blades overlap and form a complete ring.

2. An attachment for a wheel tire, comprising a plurality of lamellas, means for connecting said lamellas in wide spaced positions distributed about the periphery of said tire, each of said lamellas having a concave surface fitting the peripheral surface of said tire, plates affixed to said lamellas, each of said plates being affixed to one lamella and having an opening facing an opening of a plate affixed to a neighboring lamella, and a plurality of blades affixed to and extending in outward directions from said lamellas, said connecting means comprising pairs of bolts, the bolts of each pair having oppositely wound screw threads, and a correspondingly threaded nut for each of said pairs, said nut engaging one end of each bolt of the pair and being shorter than the distance between neighboring lamellas, the other ends of said bolts passing through two of said plates of which the openings face each other, and having heads positioned beyond said plates and engaging said plates in converging directions.

BENNO DASCH.

References Cited in the file of this patent

UNITED STATES PATENTS

| Number | Name | Date |
|---|---|---|
| 928,986 | Kruger | July 27, 1909 |
| 1,031,534 | Day | July 2, 1912 |
| 1,180,205 | Swick | Apr. 18, 1916 |
| 1,196,314 | Threlkeld | Aug. 29, 1916 |
| 1,418,661 | Loudon | June 6, 1922 |
| 1,450,288 | Hamm | Apr. 3, 1923 |
| 1,495,300 | Harford | May 27, 1924 |
| 1,566,433 | Schwinden | Dec. 22, 1925 |